United States Patent
Hwang et al.

(10) Patent No.: US 11,745,751 B2
(45) Date of Patent: Sep. 5, 2023

(54) VEHICLE AND METHOD OF MANAGING USER SETTING MENU THEREOF

(71) Applicants: HYUNDAI MOTOR COMPANY, Seoul (KR); KIA MOTORS CORPORATION, Seoul (KR)

(72) Inventors: Seok Min Hwang, Seongnam-si (KR); Yong Jin Shin, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 549 days.

(21) Appl. No.: 16/690,972

(22) Filed: Nov. 21, 2019

(65) Prior Publication Data
US 2020/0391759 A1 Dec. 17, 2020

(30) Foreign Application Priority Data
Jun. 14, 2019 (KR) .......................... 10-2019-0070567

(51) Int. Cl.
*B60W 50/08* (2020.01)
*B60W 50/00* (2006.01)
(Continued)

(52) U.S. Cl.
CPC ...... *B60W 50/085* (2013.01); *B60W 50/0098* (2013.01); *H04L 67/306* (2013.01); *H04L 2012/40215* (2013.01)

(58) Field of Classification Search
CPC . B60W 50/085; B60W 50/0098; B62D 65/00; B60R 16/02; H04L 67/306;
(Continued)

(56) References Cited

U.S. PATENT DOCUMENTS

| 6,549,949 B1 * | 4/2003 | Bowman-Amuah ... H04L 69/08 709/236 |
| 6,550,057 B1 * | 4/2003 | Bowman-Amuah ... H04L 67/42 707/999.005 |

(Continued)

FOREIGN PATENT DOCUMENTS

| CN | 1878375 A | * 12/2006 | .............. H04W 8/22 |
| KR | 10-2018-0038973 A | 4/2018 | |

OTHER PUBLICATIONS

CN-1878375-A translation (Year: 2006).*

*Primary Examiner* — Jeff A Burke
*Assistant Examiner* — Kyle T Johnson
(74) *Attorney, Agent, or Firm* — LEMPIA SUMMERFIELD KATZ LLC

(57) ABSTRACT

A vehicle and a method of managing a user setting menu (USM) enables the vehicle to add a new function after production of the vehicle so as to effectively manage the USM. The method includes: acquiring, by a conversion controller, first setting information about at least one existing function from a system controller through a first network using a first protocol; converting, by the conversion controller, the first setting information into second setting information using a second protocol; transmitting the converted second setting information to a head unit controller to manage the USM through a second network; transmitting third setting information about a one new function from a connectivity controller to the head unit controller through the second network, and updating, by the head unit controller, the USM based on the second and third setting information.

17 Claims, 5 Drawing Sheets

(51) Int. Cl.
*H04L 67/306* (2022.01)
*H04L 12/40* (2006.01)
(58) Field of Classification Search
CPC ..... H04L 2012/40215; H04L 12/40169; H04L 2012/40273; H04L 67/12; H04L 67/34; H04L 69/08; G06F 8/65; G06F 8/61
See application file for complete search history.

(56) References Cited

U.S. PATENT DOCUMENTS

| | | | | |
|---|---|---|---|---|
| 7,783,613 | B2* | 8/2010 | Gupta | H04L 67/2823 |
| | | | | 707/693 |
| 8,554,469 | B2* | 10/2013 | Stahlin | H04L 67/34 |
| | | | | 340/995.27 |
| 8,924,953 | B2* | 12/2014 | Hagihara | G06F 9/4401 |
| | | | | 717/174 |
| 2013/0055315 | A1* | 2/2013 | Reisman | H04N 21/8543 |
| | | | | 725/61 |
| 2013/0198737 | A1* | 8/2013 | Ricci | G06F 8/61 |
| | | | | 717/174 |
| 2013/0238165 | A1* | 9/2013 | Garrett | G06F 9/445 |
| | | | | 701/2 |
| 2014/0068010 | A1* | 3/2014 | Nicholson | B60R 16/0234 |
| | | | | 709/219 |
| 2017/0046962 | A1* | 2/2017 | Shipley | G01C 23/00 |
| 2017/0048359 | A1* | 2/2017 | Wagner | H04L 67/12 |
| 2019/0108010 | A1* | 4/2019 | Tillman | H04L 67/12 |
| 2019/0268420 | A1* | 8/2019 | Acharya | G06F 8/658 |
| 2020/0162318 | A1* | 5/2020 | Patil | G06F 9/4416 |
| 2020/0382338 | A1* | 12/2020 | Siergiej | H04L 12/10 |
| 2020/0391759 | A1* | 12/2020 | Hwang | H04L 69/08 |

* cited by examiner

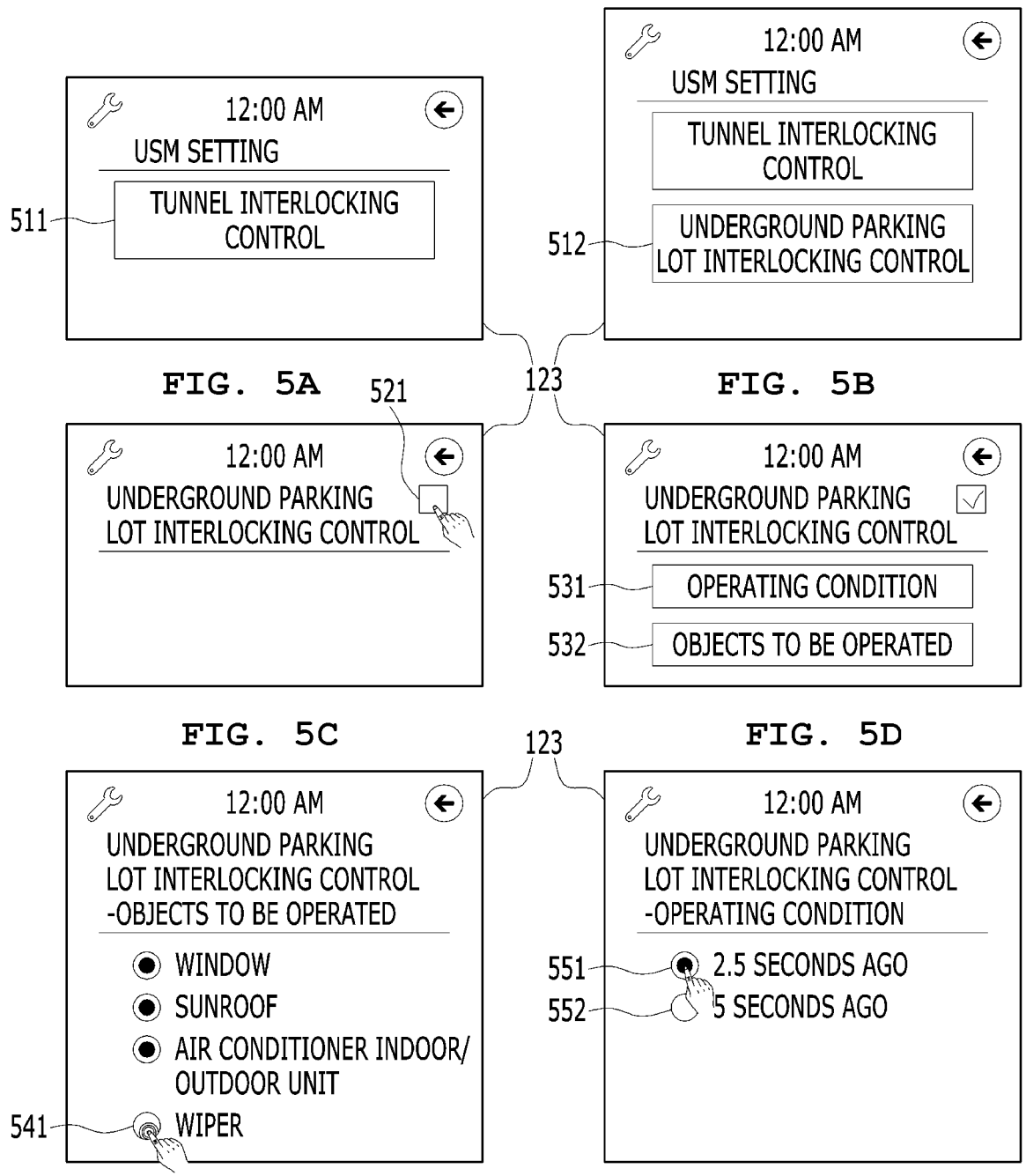

VEHICLE AND METHOD OF MANAGING USER SETTING MENU THEREOF

CROSS-REFERENCE TO RELATED APPLICATION

This application claims priority to and the benefit of Korean Patent Application No. 10-2019-0070567, filed on Jun. 14, 2019, the entire contents of which are incorporated herein by reference.

FIELD

The present disclosure relates to a vehicle and a method of managing a user setting menu thereof.

BACKGROUND

The statements in this section merely provide background information related to the present disclosure and may not constitute prior art.

In general vehicles, all functions of the vehicles are fixed at the point in time of production. Therefore, parts installed in the vehicles are developed so as to have structures that fail to consider addition of new functions. However, consumers, who have become accustomed to a smartphone environment, want a vehicle to which a new function can be added merely by downloading software even after production of the vehicle, and various third-party service providers, for example, mobility service providers, desire to rapidly reflect their own special functions for service differentiation in produced vehicles.

In order to flexibly respond to such market changes, Service-Oriented Architecture (SOA) is in the spotlight as a new vehicle development method. SOA may be implemented through a Scalable Service-Oriented Middleware on Ethernet/IP (SOME/IP) protocol between high performance controllers connected through an Ethernet network, and supports Remote Procedure Call (RPC) between applications implemented on a common SW framework regardless of the positions of installed controllers, thereby more flexibly implementing addition/deletion/convergence of applications (functions).

Even if a new function, which is not included in a vehicle at the point in time of production of the vehicle, is installed in the vehicle through SOA-based software download, in order to implement a user setting mode (USM) for the new function, software of a controller which provides an USM menu must be updated.

SUMMARY

The present disclosure is directed to a vehicle and a method of managing a user setting menu thereof that substantially obviate one or more problems due to limitations and disadvantages of the related art.

The present disclosure provides a vehicle and a method of managing a user setting menu thereof which may effectively provide the user setting menu in a new function addition situation.

The present disclosure also provides a vehicle and a method of managing a user setting menu thereof which may provide the user setting menu for a new function without updating software of a controller configured to manage the user setting menu.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

In one form of the present disclosure, as embodied and broadly described herein, a method of managing a user setting menu (USM) of a vehicle includes: acquiring, by a conversion controller, first setting information about at least one existing function implemented in production of the vehicle from at least one system controller through a first network using a first protocol; converting, by the conversion controller, the first setting information into second setting information using a second protocol configured to support Service-Oriented Architecture; transmitting the converted second setting information to a head unit controller configured to manage the USM through a second network using the second protocol; transmitting third setting information about at least one new function added after production of the vehicle from a connectivity controller to the head unit controller through the second network; and updating, by the head unit controller, the USM based on the converted second setting information and the third setting information.

In another aspect of the present disclosure, a vehicle enabling management of a user setting menu (USM) includes: at least one system controller configured to transmit first setting information about at least one existing function implemented in the vehicle through a first network using a first protocol; a conversion controller configured to acquire the first setting information through the first network and to convert the first setting information into second setting information using a second protocol configured to support Service-Oriented architecture; a head unit controller configured to acquire the converted second setting information through a second network using the second protocol; and a connectivity controller configured to transmit third setting information about at least one new function added after production of the vehicle to the head unit controller through the second network, wherein the head unit controller updates the USM based on the converted second setting information and the third setting information.

It is to be understood that both the foregoing general description and the following detailed description of the present disclosure are exemplary and explanatory and are intended to provide further explanation of the present disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 5A, 5B, 5C, 5D, 5E and 5F are views illustrating one example of a process of changing a setting depending on management of a user setting menu.

Figure 1:
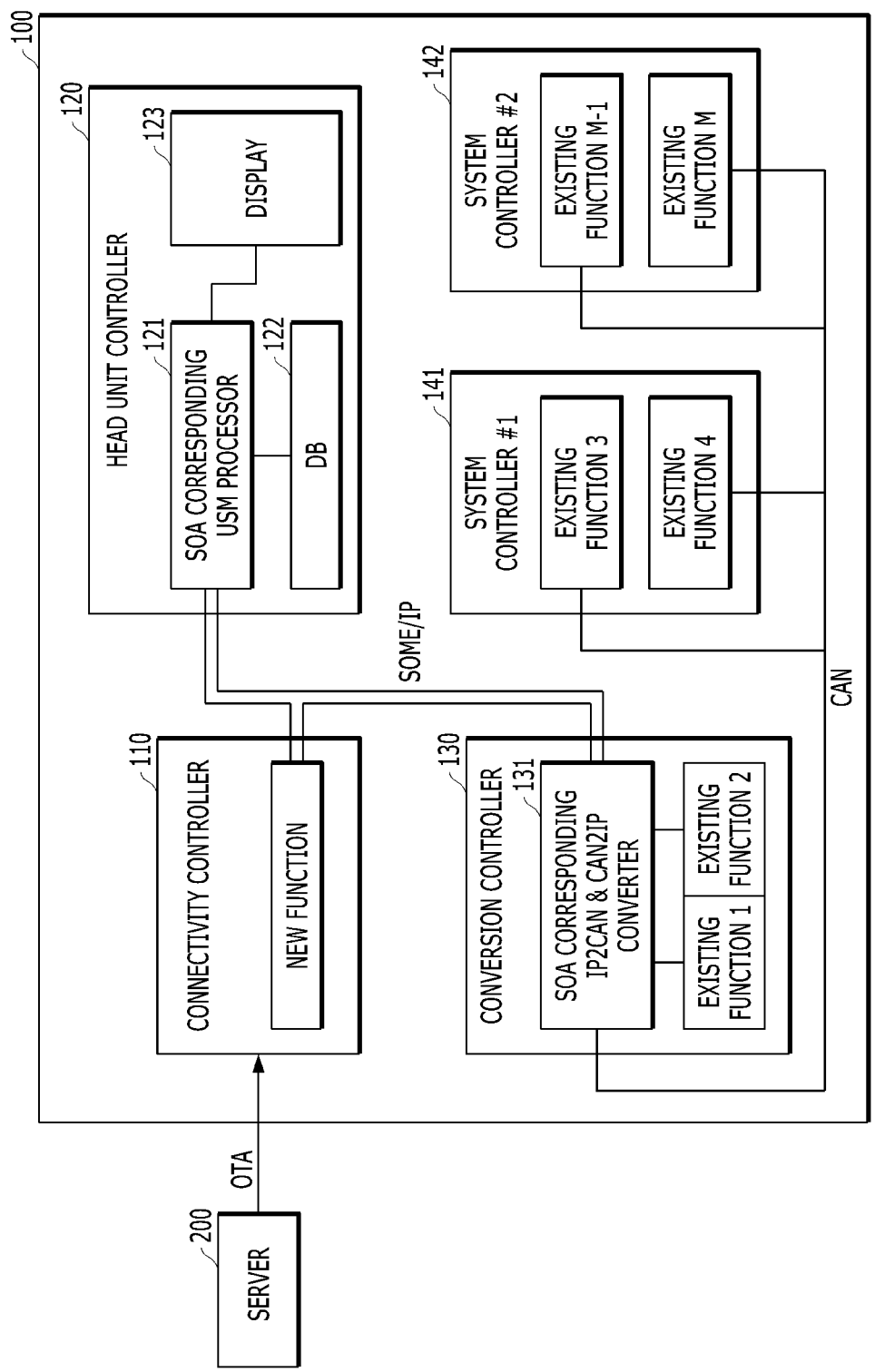
FIG. 1 is a block diagram illustrating one example of the configuration of a vehicle, which enables management of a user setting menu depending on addition of a new function.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to exemplary embodiments of the present disclosure, examples of which are illustrated in the accompanying drawings. However, the disclosure of the present disclosure is not limited to the embodiments set forth herein, and may be variously modified. In the drawings, in order to clearly describe the present disclosure, descriptions of elements which are not related to the present disclosure are omitted, and, in the following description of the embodiments, the same or similar elements are denoted by the same reference numerals even when they are depicted in different drawings.

Further, in the following description of the embodiments, the terms "including", etc. will be interpreted as indicating the presence of one or more other characteristics, numbers, steps, operations, elements or parts stated in the specification or combinations thereof, and do not exclude the presence of additional characteristics, numbers, steps, operations, elements, parts or combinations thereof, or the possibility of adding the same, unless stated otherwise.

One embodiment of the present disclosure proposes a vehicle and a method of managing a user setting menu thereof which may determine functions installed in the vehicle, including functions implemented at the point in time of production and new functions additionally installed in the vehicle, and share and update information about the user setting menu through dynamic network communication between related controllers.

FIG. 1 is a block diagram illustrating one example of the configuration of a vehicle, which enables management of a user setting menu depending on addition of a new function, in accordance with one embodiment of the present disclosure.

Referring to FIG. 1, a vehicle 100 in accordance with one embodiment may include: a connectivity controller 110, a head unit controller 120, a conversion controller 130, and one or more system controllers 141 and 142. Such a configuration of the vehicle 100 indicates only elements related to update of a user setting menu (hereinafter, abbreviated as an "USM") in accordance with this embodiment, and it will be apparent to those skilled in the art that a real vehicle may include a larger number of elements than the number of these elements. Hereinafter, respective elements will be described in detail.

First, the connectivity controller 110 may download software about a new function from a server 200 wirelessly (i.e., Over The Air (OTA)), and install and drive the software.

The head unit controller 120, which is a kind of controller to provide a Human-Machine Interface (HMI), provides a basic Audio/Video/Navigation (AVN) system function. In this embodiment, the head unit controller 120 may serve to determine whether or not a new function is present while frequently monitoring vehicle functions, to update a menu for each function which must be set by a user, and to transmit an USM set value, set by the user, to the respective system controllers 141 and 142. Of course, the head unit controller 120 is not limited to a specific kind or name thereof, as long as the head unit controller 120, which is one example of the HMI controller, may perform an HMI management function. Further, the head unit controller 120 may include an SOA corresponding USM processor 121 (hereinafter, referred to as an "USM processor" for convenience) which is in charge of SOA-based USM management, a database (DB) 122 which stores information regarding the USM, and a display 123 which outputs the USM.

The conversion controller 130 may convert signals of the one or more system controllers 141 and 142 connected by a first network using a first protocol, i.e., a general vehicle communication protocol, to signals using a second protocol for supporting SOA, share the converted signals with other controllers through a second network, and also perform inverse conversion thereof. For this purpose, the conversion controller 130 may include a converter 131.

For example, the first protocol may be a Controller Area Network (CAN) protocol, and the first network may be a network through a CAN bus. Further, the second protocol for supporting SOA may be an Ethernet-based SOME/IP protocol in which RPC communication is possible, and the second network may be an Ethernet network. In this case, in the above-described configuration of the vehicle 100, the connectivity controller 110, the USM processor 121 and the converter 131 may be connected by the Ethernet network, and communicate with one another through the SOME/IP protocol. Further, the converter 131 may be referred to as an "SOA corresponding IP2CAN & CAN2IP converter". Also, the converter 131 may convert internal information and CAN-type setting information of existing functions presenting in the system controllers 141 and 142 into a SOME/IP protocol-based Ethernet frame. Further, the converter 131 may convert a SOME/IP protocol-based Ethernet-type control signal, which will be controlled by a new function downloaded by the connectivity controller 110, into a CAN-type control signal according to SOA corresponding USM user setting information.

The new function downloaded OTA, or the like, as described above, may be installed/driven in the connectivity controller 110, and each of the system controllers 141 and 142 may include one or more functions (hereinafter, referred to as "existing functions") which are implemented at the point in time of production of the vehicle. The system controllers 141 and 142 may include a body control module (BCM), an air conditioner controller, etc., without being limited thereto. According to embodiments, the conversion controller 131 may have one or more existing functions.

Through the above-described structure, inconvenience in updating overall software of a controller managing an USM when a new function is added may be overcome, and thus, whether or not functions of a vehicle are updated may be determined in real time and the USM may be updated, thereby assuring efficiency in frequent update of the user setting menu.

Figure 2:
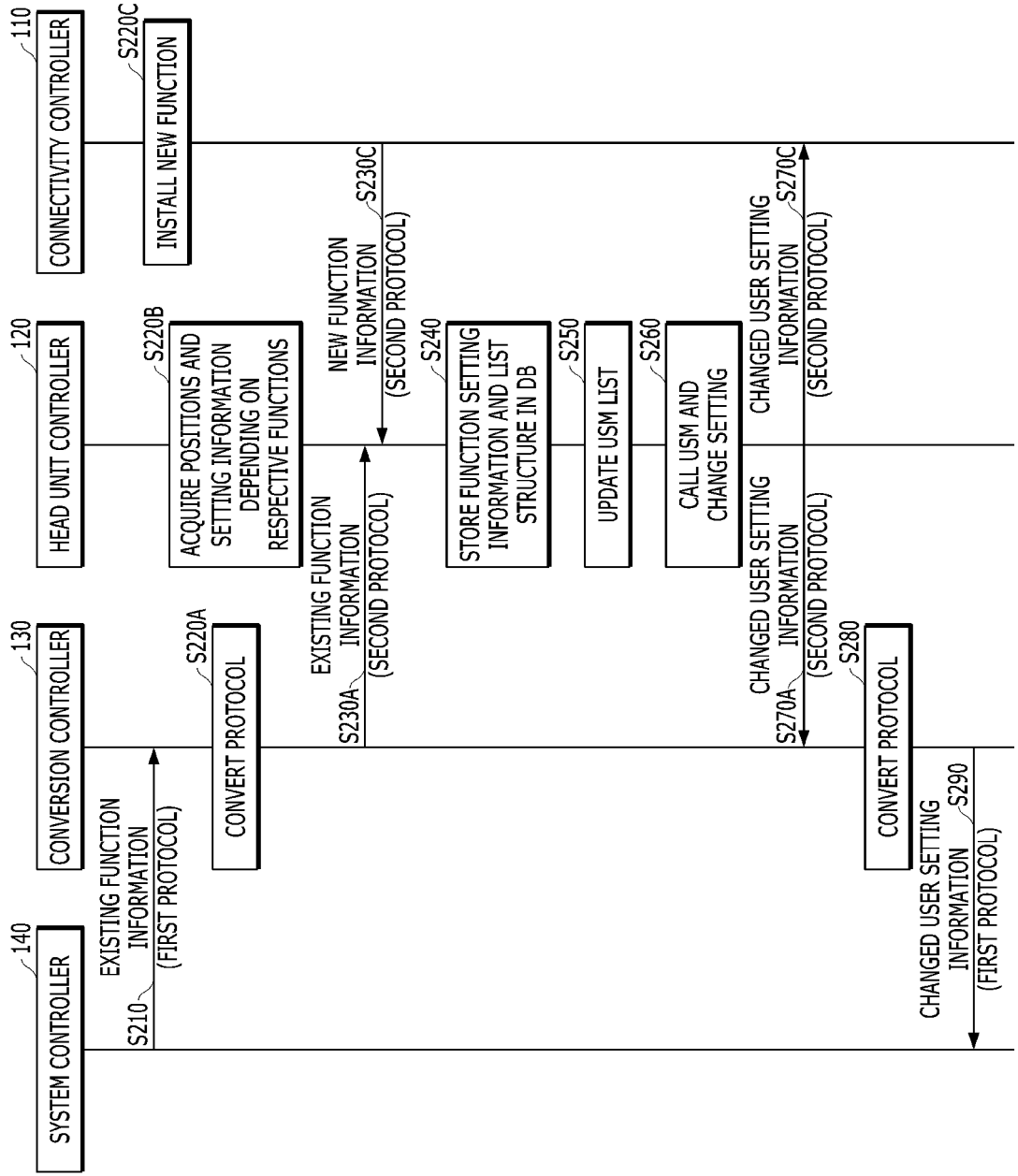
FIG. 2 is a flowchart illustrating one example of performance of management of a user setting menu.

Hereinafter, based on the above-described vehicle structure shown in FIG. 1, a process of performing update of the USM depending on addition of a new function will be described with reference to FIG. 2. FIG. 2 is a flowchart illustrating one example of performance of management of a user setting menu in accordance with one embodiment of the present disclosure.

Referring to FIG. 2, the system controller 140 having existing functions may be connected to the first protocol, i.e., the same CAN channel, and thus share information about the existing functions with a CAN bus (operation S210), and thereby, the conversion controller 130 may convert the information about the shared existing functions into information in the type of the second protocol, i.e., the SOME/IP protocol, through the converter 131 (operation S220A). The converted information about the existing functions in the type of the SOME/IP protocol may be transmitted to the head unit controller 120 through the Ethernet network (operation S230A).

Further, when a new function is installed (operation S220C), or when there is a new function that is installed in advance, the connectivity controller 110 may transmit information about the new function to the head unit controller 120 through the Ethernet network (operation S230C). Here, the information about the new function may be information in the type of the second protocol, i.e., the SOME/IP.

The head unit controller 129 for managing the USM may stand by for reception of the existing function information and the new function information from the conversion controller 130 and the connectivity controller 110, so as to acquire positions and setting information depending on respective functions (operation S220B).

Particularly, the USM processor 121 of the head unit controller 120 may dynamically collect the converted SOME/IP protocol-type information about the existing functions and the new function information, store function setting information and an USM list structure in the database 122 based on the collected information (operation S240), and update an USM list which will be displayed on the display 123 (operation S250). Here, the existing function information and the new function information collected by the head unit controller 120 may include at least one of whether or not each function is activated, objects to be controlled in detail in each function or a detailed operation condition of each function.

The above-described respective processes may be performed in each designated cycle or in real time (i.e., dynamically), after booting of the respective controllers, and of course, may be performed based on an event, for example, when a new function is installed.

Thereafter, if a user calls the USM and changes a setting of the USM (operation S260), the changed user setting information may be transmitted to related controllers (operations S270A and 270C). As one example, if a setting of an existing function is changed in the change in the USM setting, the changed user setting information in the type of the second protocol may be transmitted to the conversion controller 130, and the conversion controller 130 may convert the changed user setting information into user setting information in the type of the first protocol (operation S280) and transmit the converted user setting information in the type of the first protocol to the corresponding system controller 140. As another example, if a setting of a new function unrelated to the existing functions or the system controller 140 among new functions is changed in the change in the USM setting, the changed user setting information may be transmitted only to the connectivity controller 110. As yet another example, if a setting of a new function influencing the existing functions (for example, interworking of the existing functions through the new function) or related to the system controller 140 among new functions is changed in the change in the USM setting, the changed user setting information may be transmitted both to the conversion controller 130 and to the connectivity controller 110.

The process of changing the USM setting due to calling of the USM and a display type of the USM will be described in more detail below with reference to FIG. 4 and FIGS. 5A, 5B, 5C, 5D, 5E and 5F.

Hereinafter, execution of the existing functions and the new function will be described. When the changed user setting information is converted into first protocol-type user setting information and then the converted first protocol-type user setting information is transmitted to the system controller 140, as described above with reference to FIG. 2, the system controller 140 may perform control of the existing functions in response to the received user setting information. Execution of the new function will be described with reference to FIG. 3.

Figure 3:
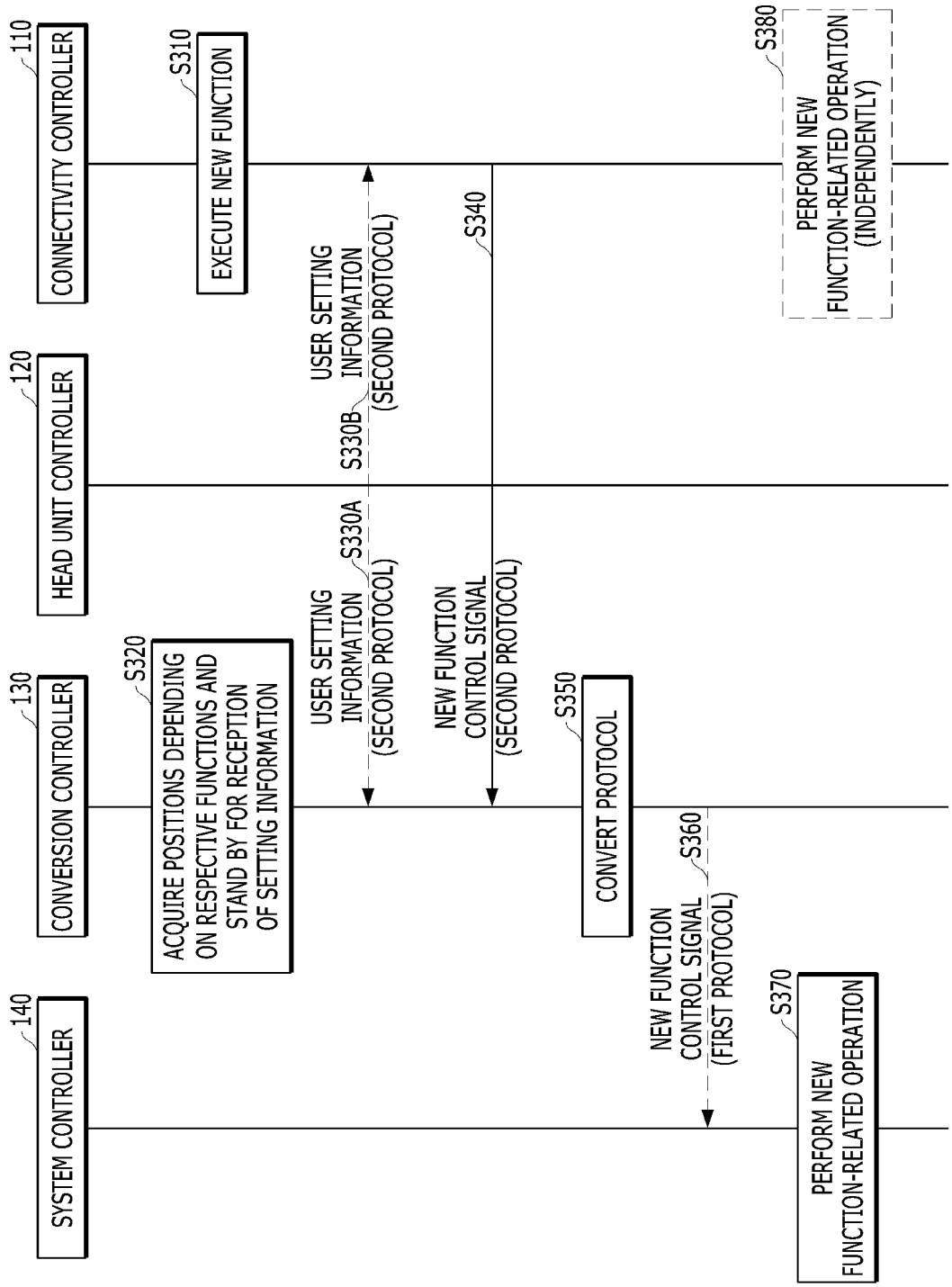
FIG. 3 is a flowchart illustrating one example of execution of a new function in a user setting menu management environment.

FIG. 3 is a flowchart illustrating one example of execution of a new function in a user setting menu management environment in accordance with one embodiment of the present disclosure.

As described above, new functions may be classified into new functions which greatly influence the existing functions or are related to the system controller 140, and new functions which are unrelated to the existing functions or the system controllers 140.

First, execution of a new function accompanying operation of the system controller 140 will be described. Depending on execution of the new function by the connectivity controller 110 (operation S310) or regardless of execution of the new function, the conversion controller 130 may acquire positions depending on respective functions and stand by for reception of setting information so as to perform dynamic update (operation S320).

If a USM setting is changed (operation S260), as described above with reference to FIG. 2, during execution of the new function, the changed user setting information may be transmitted from the head unit controller 120 to the conversion controller 130 and/or the connectivity controller 110 in real time (operations S330A and S330B).

The connectivity controller 110 may transmit a second protocol-based new function control signal to the conversion controller 130 based on the latest updated setting information of the corresponding new function so as to control the system controller 140 related to the corresponding new function (operation S340). The conversion controller 130 may convert the second protocol-based new function control signal into a first protocol-based new function control signal (operation S350), and transmit the converted new function control signal to the corresponding system controller 140. Thereby, the system controller 140 may perform a new function-related operation based on the control signal (operation S370).

On the other hand, if a new function unrelated to the existing functions or the system controllers 140 is executed, for example, a new function, which is independently executable by the connectivity controller 170, is executed, the connectivity controller 110 may control operation of the new function without communication with the conversion controller 130 (operation S380).

Hereinafter, the process of changing the USM setting due to calling of the USM and the display type of the USM will be described with reference to FIG. 4 and FIGS. 5A to 5F, respectively.

Figure 4:
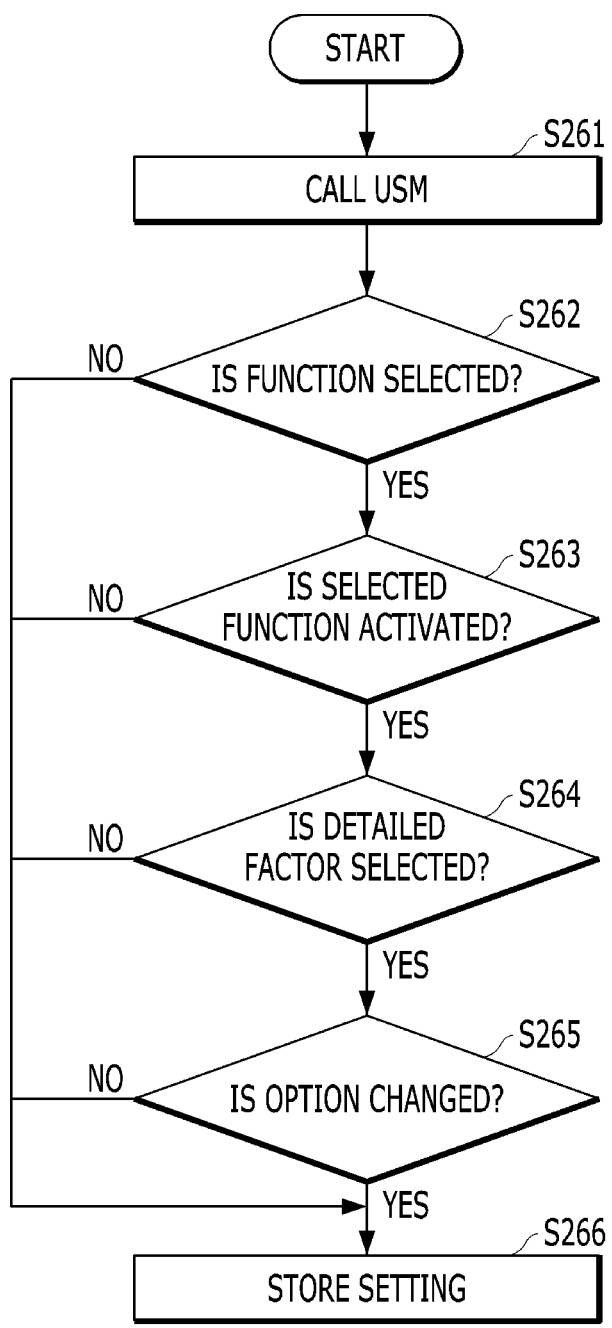
FIG. 4 is a flowchart illustrating a process of changing a setting of a user setting menu.

FIG. 4 is a flowchart illustrating one example of a process of changing a setting of a user setting menu applicable to one embodiment of the present disclosure.

Referring to FIG. 4, a user may call the USM by operating a designated input unit provided in the vehicle (operation S261). The USM called thereby may be displayed through the display 123.

When the user selects a specific function in the state in which the USM is displayed, whether or not the selected function is activated may be selected (operation S263). When the corresponding function is activated, the detailed factors (for example, an operating condition, objects to be operated, etc.) of the activated function may be selected (operation S264), and, when a specific detailed factor is selected, options of the corresponding detailed factor may be changed (operation S265). According to a change or maintenance in the existing setting in operations S262 to S265, a user setting may be stored in the database 122 (operation S266).

FIGS. 5A to 5F are views illustrating one example of a process of changing a setting depending on management of a user setting menu in accordance with one embodiment of the present disclosure.

Referring to FIG. 5A, before installation of a new function in accordance with the embodiment, the USM output through the display 123 may display only a tunnel interlocking control function 511 as existing functions. For example, it is assumed that, in the tunnel interlocking control function 511, objects to be controlled include an air conditioner, a window and a sunroof, and a control condition is 2 seconds before entering a tunnel. Further, it is assumed that the tunnel interlocking control function 511 is extended to an underground parking lot and thus an underground parking lot interlocking control function is added as a new function. In this case, in a general vehicle, the entirety of software of the head unit controller 120 must be updated so as to provide an USM for the underground parking lot interlocking control function, but, when technology in accordance with the embodiment is applied, the USM processor 121 of the head unit controller 120 may automatically recognize addition of the new function, and reflect the recognized addition of the new function in the USM. Thereby, whenever a new function is added, it is possible to flexibly and rapidly respond to addition of the new function without downloading software for the updated USM from the external server and updating the controller for managing the USM.

For example, as addition of the new function is recognized, the USM may be updated and, the underground parking lot interlocking control function 512 may be added to the USM, as shown in FIG. 5B.

Here, when the user select the underground parking lot interlocking control function 512, a check box 521 for selecting function activation may be displayed, as shown in FIG. 5C. When the check box 521 is selected, an operating condition 531 and objects to be operated 532 may be displayed as detailed menus, as shown in FIG. 5D. If a user selects the objects to be operated 532, a list of objects to be controlled through the underground parking lot interlocking control function 512 may be output, as shown in FIG. 5E. Here, when the user releases selection of a wiper item 541, wipers of the vehicle may be operated depending on their own settings regardless of entry into an underground parking lot.

On the other hand, when the user selects the operating condition 531, the user may select one of 2.5 seconds 551 and 5 seconds 552 as a time before entry into an underground parking lot, as shown in FIG. 5F.

The above-described method of managing the USM has the following effects.

In general, even in the same vehicle, there are many kinds of USMs which must be set depending on trim/options, regions and individuals, and thus many resources are consumed to respectively cope with these USMs at a development stage. However, in accordance with the embodiment, when a vehicle is booted, functions installed in the vehicle and items displayed on the USM may be automatically recognized and displayed on the USM, and thus consumption of development resources may be reduced.

Further, software of a controller for managing the USM must generally be updated whenever a new function is installed in a vehicle OTA, but, in accordance with the embodiment, the USM is automatically updated without downloading software for the updated USM from the external server, and thus, even if a new function is added to the vehicle, it is unnecessary to download software for the updated USM from the external server.

Moreover, since many controllers are influenced by a newly added function, the burden of consultation/verification during development of general vehicles is increased, but, in accordance with the embodiment, influence on other controllers due to a newly added function is reduced and new functions may be conveniently added.

Also, diversification of kinds of parts desired for implementing the USM to cope with various specifications is desired in general vehicles, but, in accordance with the embodiment, the same part may cope with various specifications, and thus, part sharing may be achieved and thereby service part costs, distribution costs and development costs may be reduced.

The above-described method in accordance with the present disclosure may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, a vehicle in accordance with at least one embodiment of the present disclosure may more effectively provide a user setting menu for a new function.

Particularly, in accordance with the embodiments of the present disclosure, since information about the new function is acquired, the configuration of the user setting menu is updated, and existing system controllers are controlled through protocol conversion so as to execute the new function, it is not necessary to update software of other controllers whenever a new function is added.

It will be apparent to those skilled in the art that various modifications and variations can be made in the present disclosure without departing from the spirit or scope of the present disclosure. Thus, it is intended that the present disclosure cover the modifications and variations of this present disclosure provided they come within the scope of the appended claims and their equivalents.

What is claimed is:

1. A method of managing a user setting menu (USM) of a vehicle, the method comprising:
    acquiring, by a conversion controller, first user setting information about at least one existing function implemented in the vehicle from at least one system controller through a first network using a first protocol;

converting, by the conversion controller, the first user setting information into second user setting information using a second protocol configured to support Service-Oriented Architecture;

transmitting the converted second user setting information to a head unit controller configured to manage the USM through a second network using the second protocol;

transmitting third user setting information about at least one new function, added in a connectivity controller through wireless downloading from an external server after production of the vehicle, from the connectivity controller to the head unit controller through the second network; and providing, by the head unit controller, an updated USM based on the converted second user setting information and the third user setting information, wherein the updated USM includes the at least one existing function and the at least one new function, and wherein the updated USM is provided by the head unit controller without downloading software for the updated USM with at least one new function from the external server.

2. The method according to claim 1, further comprising:
calling the USM;
executing a change in at least one of the at least one existing function or the at least one new function through the called USM; and
transmitting function user setting information corresponding to the change from the head unit controller to at least one of the conversion controller or the connectivity controller.

3. The method according to claim 2, wherein the function user setting information corresponding to the change is in a type corresponding to the second protocol, and is transmitted through the second network.

4. The method according to claim 3, further comprising:
when the function user setting information corresponding to the change is transmitted to the conversion controller,
converting, by the conversion controller, the function user setting information into function user setting information using the first protocol; and
transmitting the converted function user setting information from the conversion controller to a corresponding one of the at least one system controller through the first network.

5. The method according to claim 4, wherein, when the function user setting information corresponding to the change is transmitted to the conversion controller, a function corresponding to the change comprises the at least one new function influencing the at least one existing function or related to the at least one system controller.

6. The method according to claim 1, further comprising:
executing the at least one new function accompanying operation of the at least one system controller among the at least one new function;
transmitting, by the connectivity controller, a control signal for a corresponding one of the at least one system controller to the conversion controller through the second network;
converting, by the conversion controller, the control signal into a control signal using the first protocol; and
transmitting the converted control signal to the corresponding system controller through the first network.

7. The method according to claim 1, wherein each of the existing function information and new function information comprises at least one of whether each function is activated, objects to be controlled in each function, or a detailed operation condition of each function.

8. The method according to claim 1, wherein;
the first protocol comprises a Controller Area Network (CAN) protocol; and
the second protocol comprises a Scalable Service-Oriented Middleware on Ethernet/IP (SOME/IP) protocol.

9. A non-transitory computer readable recording medium having recorded thereon a program to execute the method according to claim 1.

10. A vehicle enabling management of a user setting menu (USM), the vehicle comprising:
at least one system controller configured to transmit first user setting information about at least one existing function implemented in the vehicle through a first network using a first protocol;
a conversion controller configured to acquire the first user setting information through the first network and to convert the first user setting information into second user setting information using a second protocol configured to support Service-Oriented architecture;
a head unit controller configured to acquire the converted second user setting information through a second network using the second protocol; and
a connectivity controller configured to transmit third user setting information about at least one new function, added in the connectivity controller through wireless downloading from an external server after production of the vehicle, to the head unit controller through the second network,
wherein the head unit controller is configured to provide an updated USM based on the converted second user setting information and the third user setting information, wherein the updated USM includes the at least one existing function and the at least one new function, and wherein the updated USM is provided by the head unit controller without downloading software for the updated USM with at least one new function from the external server.

11. The vehicle according to claim 10, wherein, when the USM is called and a change in at least one of the at least one existing function or the at least one new function is executed through the called USM, the head unit controller is configured to transmit function user setting information corresponding to the change to at least one of the conversion controller or the connectivity controller.

12. The vehicle according to claim 11, wherein the function user setting information corresponding to the change is in a type corresponding to the second protocol, and is transmitted through the second network.

13. The vehicle according to claim 12, wherein, when the function user setting information corresponding to the change is transmitted to the conversion controller, the conversion controller is configured to convert the function user setting information into function setting information using the first protocol, and transmit the converted function user setting information to a corresponding one of the at least one system controller through the first network.

14. The vehicle according to claim 13, wherein, when the function user setting information corresponding to the change is transmitted to the conversion controller, a function corresponding to the change comprises the at least one new function influencing the at least one existing function or related to the at least one system controller.

15. The vehicle according to claim 10, wherein, when the at least one new function accompanying operation of the at least one system controller among the at least one new function is executed:
the connectivity controller is configured to transmit a control signal for a corresponding one of the at least one system controller to the conversion controller through the second network; and
the conversion controller is configured to convert the control signal into a control signal using the first protocol, and transmit the converted control signal to the corresponding system controller through the first network.

16. The vehicle according to claim 10, wherein each of the existing function information and new function information comprises at least one of whether each function is activated, objects to be controlled in each function, or an operation condition of each function.

17. The vehicle according to claim 10, wherein;
the first protocol comprises a Controller Area Network (CAN) protocol; and
the second protocol comprises a Scalable Service-Oriented Middleware on Ethernet/IP (SOME/IP) protocol.

* * * * *